April 12, 1949. W. C. IFTIGER, SR 2,467,036
COUPLING
Filed Feb. 6, 1946
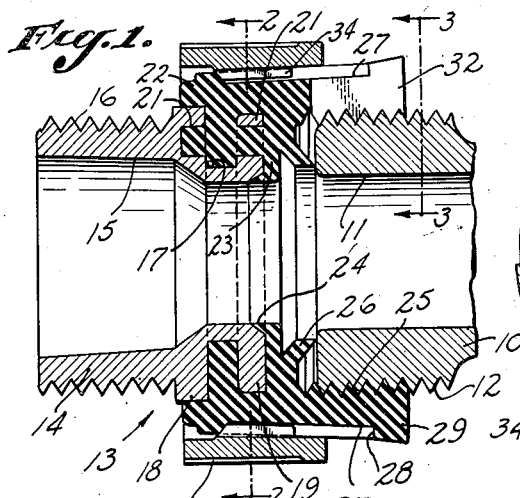
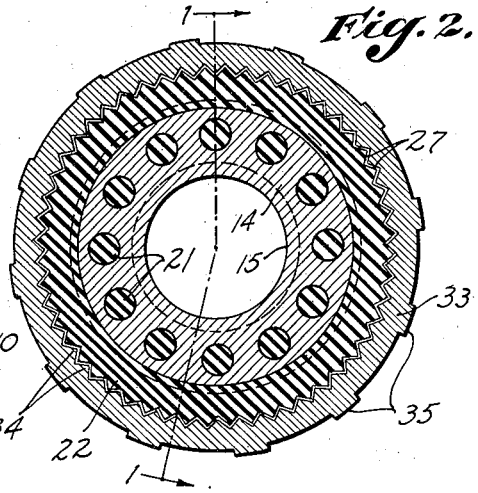
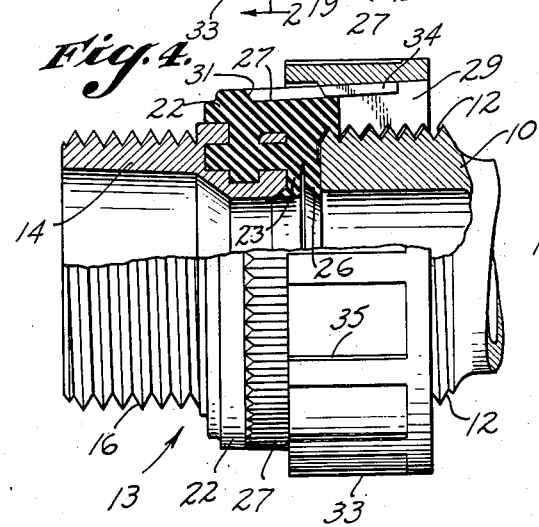
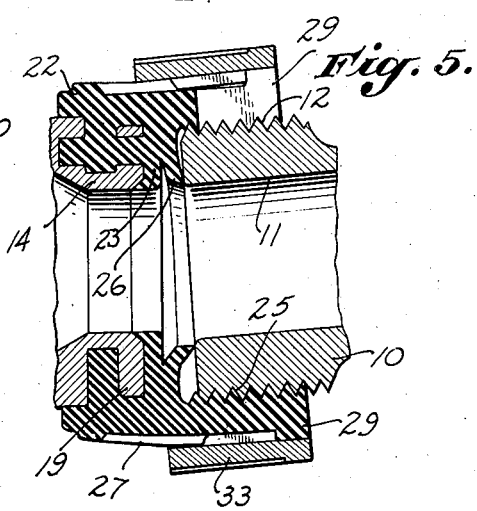
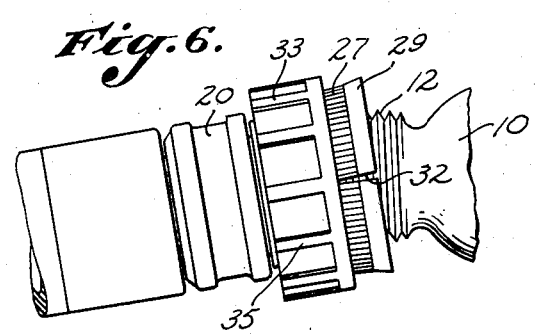
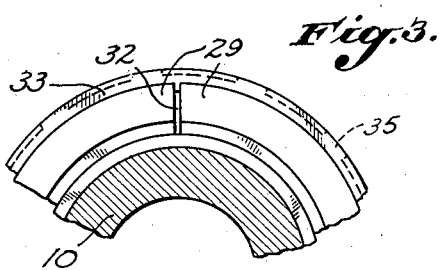
INVENTOR:
WILLIAM C. IFTIGER, SR;
BY
Russell M. Otis Patented Apr. 12, 1949

2,467,036

UNITED STATES PATENT OFFICE 2,467,036

COUPLING

William C. Iftiger, Sr., Sante Fe Springs, Calif.

Application February 6, 1946, Serial No. 645,869

7 Claims. (Cl. 285—150)

This invention relates to a coupling, and has a particularly important application in the coupling of a hose or fluid conduit to a faucet, pipe, or other fluid conducting means.

It is an object of my invention to provide a coupling which can be conveniently and rapidly connected and disconnected.

Another object is to provide a threaded female coupling which is adapted to be connected to a threaded male member such as the outlet of a faucet, a pipe, or the like, by simply pushing the female member over the threads of the male member, and which may then be tightened to make a fluid-tight connection by axially moving a part of the coupling and turning the coupling through a fraction of a turn, the two members then being securely held in coupled relation against any accidental uncoupling, but being adapted to be uncoupled by simply moving the axially movable part in the opposite direction and pulling the coupling off the male member.

A further object is to provide a coupling which can be connected to a threaded male member by pushing it straight over the male member or at an angle, and which may be disconnected from the male member by pulling it either straight off or breaking it off at an angle.

Another object of the invention is to provide a quickly connectible threaded coupling that can be readily converted into a common screw-type coupling by simply moving in the axial direction a member of the device.

Another object is to provide a quickly connectible coupling which can be connected and tightened on a threaded male member even though the threads on the male member have been nicked, galled, or distorted.

Another object is to provide a quickly-connectible coupling for connection to a threaded male member and having an internally threaded portion that cannot be damaged by abrasion or impact.

Another object of the invention is to provide a coupling in which corrosion cannot interfere with its operation.

Another object is to provide a coupling that will stay tightened even when subjected to severe vibration.

Another object is to provide a coupling which has its own sealing washer built in as an integral part of the coupling, and which is adapted to remain fluid tight even when the conduit to which the coupling is attached is pulled violently to the side.

Still another object of the invention is to provide a coupling that is adapted for cheap manufacture on a large production basis, that is small in size and weight, is dependable and fool-proof in its operation, and is durable and of long life.

These and other apparent objects are attained in a manner that will be clear from consideration of the following description taken in connection with the accompanying drawings, of which:

Figure 1 is a sectional view of my coupling taken along the line 1—1 of Figure 2, showing the female coupling member in connected, but untightened, relation with a threaded male member.

Figure 2 is a sectional view of the coupling taken along the line 2—2 of Figure 1, showing the female coupling member in connected, but untightened, relation with the threaded male member.

Figure 3 is a partial sectional view of the coupling in the condition shown in Figure 1, taken along the line 3—3 of Figure 1.

Fgure 4 is a sectional view of the coupling similar to Figure 1, except that it shows the coupling in the tightened, coupled relation with the threaded male member.

Figure 5 is a partial sectional view of the coupling, taken along the same line as Figure 4, showing the female coupling member in the tightened coupled relation with the male member, but bent at an angle thereto.

Figure 6 is a full side view of the female coupling being pushed, at an angle, over a threaded male member.

While the coupling of my invention is adapted to connect a member of any character to any threaded male member of suitable dimensions, whether or not the members to be connected are provided with fluid passages therethrough, I have chosen to disclose herein that important embodiment of my invention in which a female couplng member, having a fluid passage there through, is threaded on one end for semi-permanent connection with a fluid conduit such as a hose and on the other end is adapted to be quickly coupled to a threaded cylindrical male member 10 having a fluid passage 11 therethrough and external threads 12 and which male member may constitute the connecting part of a valve or faucet, or the end of a pipe or hose, or the like.

The female coupling member, generally designated by the numeral 13, preferably includes a member 14, having a fluid passage 15 therethrough, and being threaded on the external surface adjacent one end at 16. In the garden hose application of the coupling, the threaded portion 16 is preferably screwed into the rotatable end connection 20 of a hose. The member 14 is preferably made of a stiff material such as metal, which is preferably die-cast into the desired form. The member 14 preferably has a groove 17 formed therein which, in effect, produces two outwardly extending flanges 18 and 19 in which a plurality of holes 21 are located. The holes 21 are preferably uniformly spaced circumferentially in the flanges and preferably pass completely through the flange 19 but extend only part way into the flange 18.

Attached to the member 14 is a member 22 made of resilient material. The member 22 is preferably composed of synthetic rubber or similar plastic and is preferably molded into and onto the member 14 to attach it permanently thereto. In the molding operation the rubber fills the groove 17 and all of the holes 21 so as to grip tightly the flanges 18 and 19 and to form an inwardly directed flange portion 23 covering the flange 19 and connecting through the holes 21 with the rubber in the groove 17. The portion 23 preferably terminates at its inward end in a sharp-edged lip portion 24 extending in an axial direction along the wall of the fluid passage 15. Preferably, the material of the member 22 is not bonded to the material of the member 14.

The member 22 is formed at its forward end with a cylindrical cavity having internal threads 25 having substantially the same pitch and pitch diameter as the threads 12 of the male member. A portion of the member 22 forming the end wall of this cavity projects forwardly from the flange portion 23 to form a sealing lip 26 which presents a relatively thin, sharp edge to the end of the entering male member 10. This sealing lip 26 has great elasticity and can seal the connection with the male member 10 over quite a wide range of its travel, as illustrated in Figures 4 and 5. One of the factors favorable for sealing is the effect of pressure in the fluid passage 11 on the lip 26. Pressure of fluid against the lip 26 easily deflects and wedges it into tight sealing contact with the end of the member 10. The end of the cavity in the member 22 performs two functions—that of acting as a stop for the member 10 and of sealing the contact with the end of the member 10. It is thus one form of sealing stop for the member 10 in the tightened condition of the coupling.

The exterior of the member 22 is preferably tapered so that the end at which the member 10 enters is of larger outside diameter, and has formed in it a plurality of grooves 27, preferably of triangular cross-section. The grooves 27 preferably terminate at the outer end in a right-angular shoulder 28 beyond which is a solid face portion 29, the external surface of which preferably tapers with a slightly greater angle to the axis than does the grooved portion of the member 22. The grooves 27 terminate at their inner ends at shoulders 31 preferably lying at an acute angle relative to the axis. That part of the member 22 forming the peripheral wall of the cavity which receives the threaded male member is preferably slit radially at a plurality of places, as at 32, the slits being preferably four in number and preferably extending through the face portion 29 and back through nearly all of the threaded portion of the member 22, as shown in Figures 1 and 3. The slit portion of the peripheral wall of the cavity thus forms a plurality of resilient internally threaded annular sectors which are readily deflected radially outwardly, but which tend to return to positions in which they form a complete circular wall.

Surrounding the member 22 is a ring 33, preferably die-cast of metal, having a serrated internal surface providing tongues 34 which fit into the grooves 27 in such manner that the ring 33 is not rotatable on the member 22 but is axially slidable thereon. The tongues 34, at their outer ends, terminate in right-angular faces which are adapted to engage the shoulder 28 in the outermost position of the ring 33, as in Figure 4, and terminate in acute-angular faces at their inner ends which are adapted to engage the shoulders 31 in the innermost position of the ring, as in Figure 1. The tongues 34 slope axially at the same angle as the grooves 27 and are dimensioned in such manner that when the ring 33 is in its outermost position, as in Figure 4, the tongues 34 have substantially the same shape and dimensions as the grooves 27. In this position of the ring, the outer end thereof compresses the face portion 29 of the member 22, causing it to conform to the internal surface of the ring and closing the slits 32. In this condition, the threads 25 on the inside of the member 22 are of substantially the same shape, pitch, and pitch diameter as the threads 12 of the male member 10. The external surface of the ring 33 is preferably ridged as at 35 to make it easier to grip.

In the use of my coupling, it is preferably installed and brought to a tightened coupled relation with the threaded male member as follows. The threaded end 16 is first screwed into the rotatable end connection 20 of a hose, for example. No washer need be put in the coupling because of the efficient action of the sealing lip 26. To couple the hose to the threaded male member 10, the ring 33 is first slid back to its innermost position with the tongues 34 in engagement with the shoulders 31 and the coupling is then forced on over the threads 12 of the male member 10 by pushing the coupling either straight axially, or by a kind of combination of axial and bending motion, until the coupling is as far on the male member as it can easily be put with the threads 25 of the resilient member 22 meshing with the threads 12 of the male member. This stage is illustrated in Figure 1. The sealing lip 26 is in engagement with the end of the male member 10, but the coupling is not yet in the tightened relation.

The next step is to push the ring 33 axially outward to its outermost position, as in Figure 4, with the tongues 34 in engagement with the shoulder 28. The whole member 13, together with the connection 20, is then turned in the tightening direction to screw it onto the male member 10 the short remaining distance to bring the end of the male member 10 tight up against the flattened sealing lip 26, as in Figure 4. The rotation required to effect this tightening is generally considerably less than one turn. The coupling is, in this condition, tight and free from fluid leak. The rotation of the coupling has somewhat expanded the threaded portion of the member 22 and forced it against the internal surface of the ring 33 to frictionally hold the ring 33 in place with sufficient force to retain it even under conditions of severe vibration. The hose and the connected member 14 of the coupling can, in this condition of the coupling, be moved sideways through wide angles while the resilient member 22 deflects to accommodate the change, as in Figure 5. It will be seen that the sealing lip 26 is still in contact at both top and bottom, in Figure 5, and no leak will occur.

When it is desired to loosen and remove the coupling, it is only necessary to pull the ring 33 axially to its innermost position with the tongues 34 in engagement with the shoulders 31 and then pull the coupling off of the male member. It can be pulled straight off axially in which case the split resilient member 22 simply deflects radially outward sufficiently to allow the threads 12 to pass. Or the coupling can be bent off at an angle, as illustrated in Figure 6. When one is familiar with the coupling, he can easily combine the motions of pulling back the ring and pulling off the coupling so as to make substantially only a single motion. No turning of any part is required to remove the coupling. Following removal of the coupling from a male member, the parts are in proper relation for immediately coupling to another male member without any further adjustment.

Since the material composing the member 22 containing the threaded portion of the coupling is preferably rubber, or the like, corrosion can have no effect on the operation of the coupling. Moreover, nicked, galled or distorted threads on a male member may be accommodated by my coupling, the threads of which are flexible. Also, my coupling can be knocked about and subjected to abrasion and impact without damaging it because of the resilient character of the threaded portion. It will be recognized, furthermore, that the coupling of my invention is very easy and cheap to make for, in the preferred embodiment illustrated herein, it comprises but two die-cast metal parts and one molded rubber part.

It is understood that various changes and modifications in design and construction from the coupling disclosed herein may be made without departing from the spirit and scope of the invention as defined in the appended claims.

I claim as my invention:

1. A coupling for connection with a threaded cylindrical male member, comprising: a first member composed of resilient readily deformable material and shaped to provide an internally threaded cylindrical cavity adapted in the normal undeformed condition to mate with said threaded male member, the peripheral wall of said cavity being readily deformable outwardly over the threads of said male member upon either insertion over or withdrawal from said male member; a sealing stop for said male member at the end of said cavity; and a second member mounted axially slidable with respect to said first member and adapted in its axially outermost position to restrict radially outward movement of said first member.

2. A coupling for connection with a threaded male member, comprising: a first member composed of rubber-like material and having walls forming an internally threaded cavity adapted in the normal undeformed condition to mate with said threaded male member, the peripheral wall of said cavity being slit through to facilitate radially outward movement of said wall; and a second member mounted axially slidable but non-rotatable with respect to said first member and adapted in its axially outermost position to restrict radially outward movement of said peripheral wall.

3. A coupling for connection with a threaded male member, comprising: a coupling member composed of rubber-like material and shaped to provide an internally threaded cavity having in the normal undeformed condition threads of substantially the same pitch and pitch diameter as those on said male member, the peripheral wall of said cavity being outwardly deformable over the threads of said male member, and the external surface of said coupling member having substantially axially directed grooves therein of limited length; and a ring surrounding said coupling member and having tongues extending into said grooves in such manner that said ring is axially slidable but non-rotatable with respect to said coupling member, said ring being adapted in its axially outermost position to restrict radially outward movement of said coupling member.

4. A coupling for connection with a threaded male member, comprising: a first member composed of resilient readily deformable material and having walls forming an internally threaded cavity adapted in the normal undeformed condition to mate with said threaded male member, the peripheral wall of said cavity being outwardly deformable over the threads of said male member, and a portion of the end wall of said cavity being in the form of a sealing lip projecting into said cavity and adapted to engage the end of said male member; and a second member mounted axially slidable but non-rotatable with respect to said first member and adapted in its axially outermost position to restrict radially outward movement of the peripheral wall of said cavity.

5. A coupling for connection with a threaded male member, comprising: a coupling member composed of rubber-like material and having walls forming an internally threaded cavity having in the normal undeformed condition threads of substantially the same pitch and pitch diameter as those on said male member, the peripheral wall of said cavity being slit through to facilitate radially outward movement of said peripheral wall, and a portion of the end wall of said cavity being in the form of a sealing lip projecting into said cavity and adapted to engage the end of said male member, the external surface of said coupling member having substantially axially directed grooves therein of limited length; and a ring surrounding said coupling member and having tongues extending into said grooves in such manner that said ring is axially slidable but non-rotatable with respect to said coupling member, said ring being adapted in its axially outermost position to restrict radially outward movement of said peripheral wall.

6. A coupling for connection with a threaded male member, comprising: a stiff tubular member having an annular groove in its external surface and a plurality of holes therein extending axially in both directions from said groove and through the outermost face of said tubular member; a second member composed of resilient material molded in said groove and said holes and covering said face and being shaped to provide an internally threaded cavity adapted to mate with said male member; and a ring surrounding said second member and mounted axially slidable but non-rotatable thereon and adapted in its axially outermost position to restrict radially outward movement of said second member.

7. A coupling for connection with a threaded male member, comprising: a stiff tubular member having an annular groove in its external surface and a plurality of holes therein extending axially in both directions from said groove and through the outermost face of said tubular member; a second member composed of resilient material molded in said groove and said holes and covering said face and being shaped to provide a cavity the peripheral walls of which comprise a plurality of internally threaded resilient annular sectors forming in their radially innermost positions a complete nut mating with said threaded male member, a portion of the end wall of said cavity being in the form of a sealing lip projecting into said cavity and adapted to engage the end of said male member, and the external surface of said second member being tapered and having substantially axially directed grooves therein of limited length; and a ring surrounding said second member and slidable in said grooves, said ring being adapted in its axially outermost position to surround the large diameter end of the tapered surface and restrict the radially outward movement of said resilient sectors.

WILLIAM C. IFTIGER, SR.

REFERENCES CITED

The following references are of record in the file of this patent:

UNITED STATES PATENTS

| Number | Name | Date |
|---|---|---|
| 199,784 | Brumbaugh | Jan. 29, 1878 |
| 1,001,069 | Nielsen | Aug. 22, 1911 |
| 1,120,340 | Smith et al. | Dec. 8, 1914 |
| 1,309,780 | Schonfarber | July 15, 1919 |
| 2,259,137 | Iftiger | Oct. 14, 1941 |
| 2,327,714 | Iftiger | Aug. 24, 1943 |